United States Patent [19]

Dawson et al.

[11] 4,250,327
[45] Feb. 10, 1981

[54] POLYMERIC YELLOW COLORANT

[75] Inventors: Daniel J. Dawson, Los Altos; Kenneth M. Otteson, San Bruno; Roman Davis, Palo Alto, all of Calif.

[73] Assignee: Dynapol, Palo Alto, Calif.

[21] Appl. No.: 516

[22] Filed: Jan. 2, 1979

Related U.S. Application Data

[63] Continuation of Ser. No. 786,310, Apr. 11, 1977, abandoned, which is a continuation-in-part of Ser. No. 748,575, Dec. 8, 1976, abandoned.

[51] Int. Cl.³ ............... C07C 143/55; C07C 101/26; C07C 69/353
[52] U.S. Cl. ............................... 560/169; 260/326.25; 260/326.61; 260/326.9; 260/502.5; 260/507 R; 260/510; 560/193; 426/250
[58] Field of Search ............... 260/510, 508, 507 R, 260/502.5, 326.25, 326.61, 326.9; 426/250; 560/169, 193

[56] References Cited

U.S. PATENT DOCUMENTS

| | | | |
|---|---|---|---|
| 2,221,131 | 11/1940 | Fischer et al. | 260/508 |
| 3,920,855 | 11/1975 | Dawson et al. | 426/250 |
| 3,957,860 | 5/1976 | Lenoir | 260/508 |
| 3,976,797 | 8/1976 | Furia | 426/250 |
| 4,018,826 | 4/1977 | Gless, Jr. et al. | 426/250 |

Primary Examiner—Nicky Chan
Attorney, Agent, or Firm—Burns, Doane, Swecker & Mathis

[57] ABSTRACT

A group of water-soluble polymeric yellow colors and their preparation is disclosed. These colors comprise a plurality of units of a chromophore of the formula

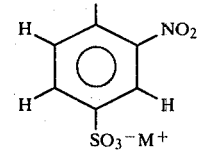

wherein $M^+$ is a pharmaceutically acceptable monovalent cation attached directly to amine units present in a nonchromophoric polymer backbone. In a preferred embodiment of the invention the backbone is a homopolymer or copolymer of vinylamine. These colorants find special utility as nonabsorbable colorants for edibles, especially foods and beverages, where their yellow hue is an excellent color match for existing monomeric azo food colors such as tartrazine, and as components of acid-insoluble pigment lakes which are themselves suitable for use in edibles.

47 Claims, No Drawings

POLYMERIC YELLOW COLORANT

This is a continuation, of application Ser. No. 786,310, filed Apr. 11, 1977, now abandoned, which in turn is a continuation-in-part of Ser. No. 748,575, filed Dec. 8, 1976, now abandoned.

BACKGROUND OF THE INVENTION

1. Field of the Invention

This invention relates to new polymeric colorants which find especial utility as yellow food colors.

2. The Prior Art

FD&C Yellow #5, a monoazo dye of the formula

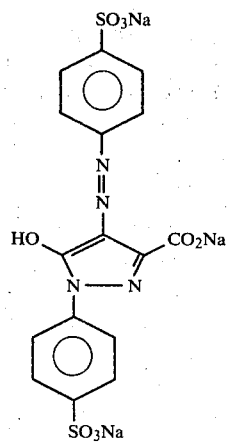

commonly known as tartrazine, has a "lemon yellow" hue which has placed it among the three most widely used colors in foods, drugs and cosmetics. It finds use alone in gelatin desserts, jellies, beverages and the like and as a component of orange through green blends for use in both edibles and nonedibles.

The past decade has seen a sustained attack on the general class of monoazo food colors. A number of these materials, most notably Reds No. 2 and No. 4, have been found to be unsafe and banned from food use by governmental action. There is continuing questioning of the safety of the monoazo colorants which is causing a search to be made for properly hued, safe replacements. In the case of tartrazine, certain natural carotinoid colors can function as replacements. However, the carotinoids are relatively very expensive. The present invention seeks to provide a nonazo color replacement for the yellow colorant tartrazine. This invention concerns a limited class of polymeric nitrosulfanilic acid colorants. The advantage of polymeric colorants in food coloring applications is disclosed in general terms in U.S. Pat. No. 3,920,855, issued Nov. 18, 1975 to Dawson et al., in copending United States Patent application, Ser. No. 520,530, filed Nov. 4, 1975, by Gless et al. now U.S. Pat. No. 4,018,826, and in Japanese Patent Applications of Tanabe, such as 41-14433, 41-14434, and 41-13382. These references show that when colorants are employed in polymeric form having a molecular size exceeding a certain limit—usually a molecular size of greater than 1,000 or 2,000 daltons—and if the color compounds do not break down in use, and thus maintain this size, the polymeric colorants are not absorbed through the walls of the gastrointestinal tract. This means that when such colorants are ingested, they pass essentially directly through the gastrointestinal tract. They are not taken through the tract walls into the body or its systemic circulation. Thus, risk of systemic toxicity is reduced or eliminated. The present invention is an extension of these prior art disclosures and involves a family of polymeric colorants having particularly attractive color properties.

STATEMENT OF THE INVENTION

The new and useful polymeric colorants of this invention are characterized as having a nonchromophoric organic backbone of molecular weight 1,000 to 200,000 daltons to which is covalently attached through amine groups a plurality of chromophore units of the formula

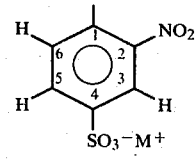

wherein $M^+$ is a pharmaceutically acceptable monovalent ion preferably selected from $K^+$, $Na^+$ and $NH_4^+$. The amine group is immediately adjacent to the chromophore aromatic ring and bonded thereto with a carbon-nitrogen single bond, thus achieving a nitrosulfanilic acid structure

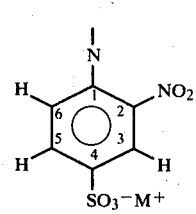

The preparation and use in food of these materials is also shown herein. The use of these materials in acid-insoluble pigments, themselves useful in foods, is also shown.

DETAILED DESCRIPTION OF THE INVENTION

The colorant compositions of this invention comprise a plurality of units of a particular chromophore unit covalently bonded to a polymer backbone through amine groups on the backbone.

The Chromophore

The chromophore employed in the colorant materials of this invention is a

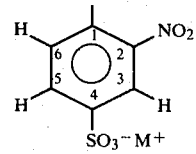

group, that is a 2-nitrobenzene-4-sulfonic acid salt. As is demonstrated in the comparative experiments which accompany the examples, the placement of the nitro and sulfonic acid groups in the 2 and 4 position, respectively, is critical to the color desired of these materials. Reversing these positions or substituting other electronically similar groups interferes with the clear yellow color achieved with the materials of this invention. The presence of a sulfonate group on the chromophore assures that the polymeric colorants of this invention are water soluble, that is, that they have a solubility in room temperature pH 7 water of not less than 1,000 ppm by weight. The cation of the sulfonic acid is a pharmaceutically acceptable monovalent cation as is known to those skilled in the art. Preferred cations represented by $M^+$ include $Na^+$, $K^+$ and $NH_4^+$, with $Na^+$ being most preferred.

The Backbones

The chromophores are linked into polymeric form via a nonchromophoric organic backbone, that is, a backbone which itself does not present visual colors to the human eye. These backbones may be further characterized as having essentially no crosslinks and as containing only covalent bonds which are stable under the acidic, basic, and enzymatic conditions of passage through the mammalian G.I. tract. This stability is required to assure that the polymeric colorants retain their nonabsorbable size during G.I. tract passage.

Preferred backbones are carbon-nitrogen aliphatic secondary amine backbones, carbon-oxygen aliphatic ether backbones, and essentially linear alkyl carbon-carbon backbones, each having molecular weights of from about 2,000 to about 100,000 daltons. The carbon-carbon backbones are more preferred.

Pendant from or present in the backbones are primary or lower secondary amine groups. At least a portion of these amine groups are used to join the chromophore units to the backbone via a chromophore aromatic carbon to amine nitrogen single covalent bond. Such a bond is shown structurally as

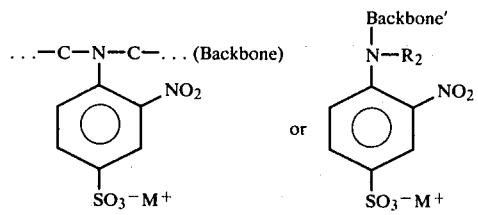

wherein Backbone' is a linear alkyl hydrocarbon backbone or a carbon-oxygen aliphatic ether backbone, $R_2$ is hydrogen or a lower alkyl, such as from 1 to 4 carbon atoms, preferably hydrogen, methyl or ethyl. The amine groups may be bonded directly to a backbone carbon, but it is also suitable to have an organic bridge of up to 10 carbon atoms in between the backbone and the amine. This organic bridge should be stable under the conditions of food processing and use. This results in the generic structure

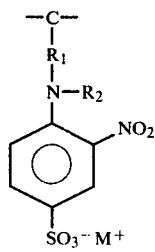

wherein —C— is a backbone carbon and $R_1$ is a C to N single covalent bond, a 1 to 4 carbon alkylene, a 6 carbon arylene, a 7 to 10 carbon alkarylene, a 2 to 4 carbon oxoalkylene, a 2 to 4 carbon ester, a 2 to 4 carbon amine or the like.

Representatives of these backbone to amine structures include the structure wherein the amine is present in the backbone

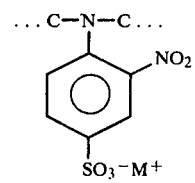

and the following structures wherein the amine is pendant from the backbone.

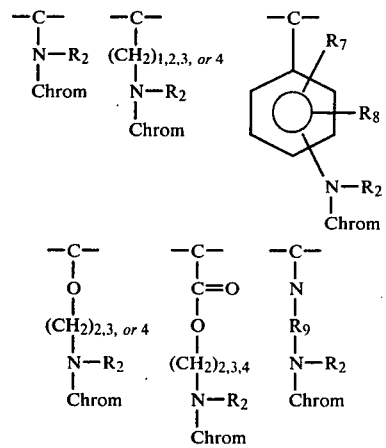

wherein "Chrom" is

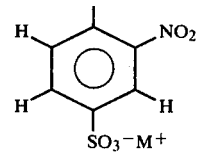

$R_2$ is as previously defined, $R_7$ and $R_8$ independently are hydrogen or lower alkyls totaling at most 4 carbons and $R_9$ is a 2 to 4 carbon alkylene. Another useful pendant link occurs when $R_1$ is a methylene and $R_2$ is methylene and joins to the backbone as well in a "diallyl amine" configuration.

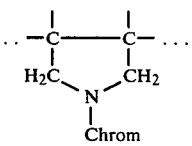

Other equivalent organic bridges may be employed as well.

Among the links the pendant amine type are preferred with the simple

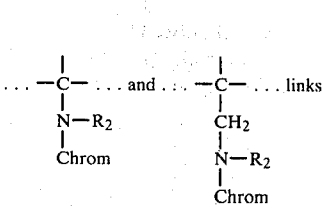

(i.e., $R_1$ is a carbon to nitrogen single bond or a methylene link) being more preferred. $R_1$ being a carbon to nitrogen single bond is the most preferred configuration.

The backbones may contain other chemical entities as well. For example, they may contain lower alkyl (methyl or ethyl) substituents; residual amine groups, that is, amine groups which do not carry a chromophore substituent; and/or polar groups such as pharmaceutically acceptable cation salts, e.g., $K^+$, $Na^+$ or $NH_4^+$ salts of a carboxylic acid, sulfonic acid or phosphonic acid. The polar groups, if present, can increase the water-solubility of the colorant. The residual amine groups can be present as amines or as acetylated amines—i.e., amides. The acetylation of residual amines is of advantage to assure good solubility in acidic environments and is described more fully in copending U.S. patent application Ser. No. 743,205 of Wingard et al, now U.S. Pat. No. 4,169,203.

Among the colorants, those having a carbon-carbon backbone are preferred. These are most commonly formed by polymerizing vinylamine or alkylamine or a substituted vinylamine or alkylamine as protected precursors or copolymerizing one of these materials with vinyl sulfonate, acrylic acid, vinylphosphonate or the like. These preferred backbones yield colorants of the structure shown in Formula I.

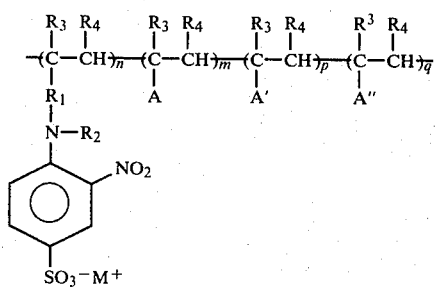

wherein $R_1$ and $R_2$ are as already defined; $R_3$ and $R_4$ are hydrogen, methyl or ethyl, and preferably hydrogen and A, A' and A" are independently selected from among the materials listed in Table I.

TABLE I

| Residual amines | |
|---|---|
| | 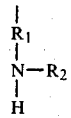 |
| Acetylated residual amines | |
| | 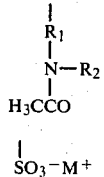 |
| Sulfonic acid salts | |
| |  |

TABLE I-continued

| Carboxylic acid salts | |
|---|---|
| |  |
| Phosphonic acid salts | |
| |  | wherein $M^+$ is as previously defined.

One of A, A' and A" may be chromophore units,

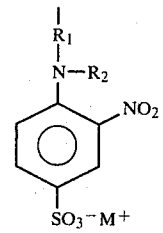

as well so that instead of a four unit copolymer, a three or two unit copolymer can result. n, m, p and q are numbers defined as follows: $n+m+p+q=40$ to 8000; $n \geq 0.2(m+p+q)$. Preferably, $R_2$, $R_3$ and $R_4$ are hydrogens and $R_1$ is a carbon to nitrogen single bond. Among the colorants defined by Formula I, there are four preferred types.

In the first of these preferred colorants A and A' are chromophore and A" is residual amine. Such a material may be shown as in Formula II.

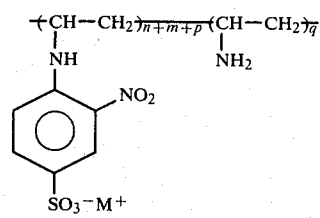

wherein: $M^+$ is as already defined and preferably is $Na^+$; $n+m+p+q$ equals 500 to 7000; and $n+m+p$ equals 0.3 to 10 times q, preferably 1 to 7 times q, and more preferably 1.25 to 4 times q.

In the second of these preferred colorants, A is chromophore, A' is acetylated amine and A" is residual amine. Such a material may be shown as in Formula III.

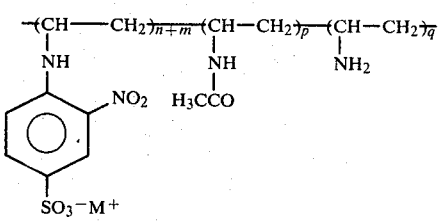

wherein $M^+$ is as defined and preferably $Na^+$; $n+m+p+q$ equals 500 to 7000; $n+m$ equals 0.3 to 10 times $p+q$, preferably 1 to 7 times $p+q$ and more preferably 1.25 to 4 times $p+q$; and q equals from 0.01 to 0.2 times p and preferably from 0.02 to 0.1 times p. Colorants of this type wherein $n+m$ equals 900 to 3500, p is 600 to 2000 and q is 10 to 100 with the ratio n+m:p:q being about 6:4:0.1, i.e., 5.5–6.5:3.5–4.5:0.03–0.15 are especially advantageous.

In the third of these preferred colorants, A is polar group, especially sulfonate, A' is chromophore and A" is residual amine. Such a material may be shown as in Formula IV.

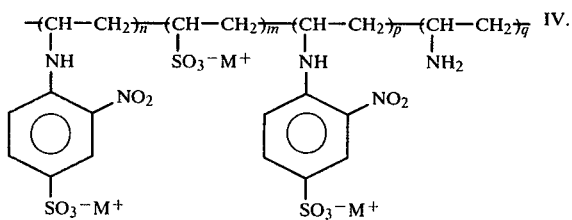

wherein M+ is Na+ or, as defined, n+m+p+q equals 40 to 4000 and preferably 80 to 2000; n+p+q equals from 0.15 to 7 times m, preferably 0.5 to 4 times m and more preferably 0.75 to 2.5 times m; n+p equals from 0.3 to 10 times q, preferably 1 to 7 times q, and more preferably, 1 to 3 times q.

In the fourth of these preferred colorants, A is polar group, especially sulfonate, A' is acetylated amine, and A" is residual amine. Such a material may be shown as in Formula V.

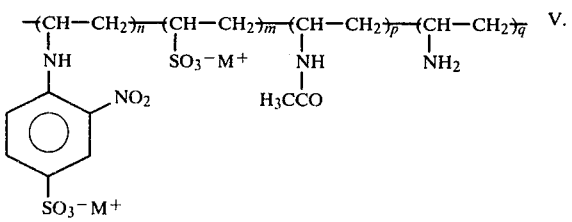

wherein M+ is sodium or as defined. n+m+p+q equals 40 to 4000 and preferably 80 to 2000; n+p+q equals from 0.15 to 7 times m, preferably from 0.5 to 4 times m and more preferably from 0.75 to 2.5 times m; n equals from 0.3 to 10 times p+q, preferably from 1 to 7 times p+q, and more preferably from 1 to 3 times p+q; and q equals from 0.01 to 0.2 times p and preferably from 0.02 to 0.1 times p.

| n equals from | 150 to 500 |
| m equals from | 200 to 600 |
| p equals 250 to 700 | |
| 9 equals | 25 to 100 | and the ratio of n:m:p:q is about 5:7:8:10.5, i.e., 4.5–5.5:6.5–7.5:7.5–8.5:0.1–1.0 are especially advantageous.

Preparation

The preparation of colorants of this invention is generally carried out as follows: a preformed amine containing polymer, such as polymers of ethyleneimine, alkylamine, dialkylamine, aminostyrene, methylaminostyrene, aminoethylacrylate or vinylamine, or the like, each either alone or as copolymers with vinylsulfonate, vinylphosphonate, acrylic acid or methacrylic acid or the like, but especially polyvinylamine or copolyvinylamine/vinylsulfonate, is used as backbone and as the source of the amine groups. Representative vinylamine polymers and copolymers and their production are disclosed in United States Patent Applications 520,530 of Gless et al., now U.S. Pat. No. 4,018,826, and 638,731 of Otteson et al., now U.S. Pat. No. 4,096,134 respectively, and are made a part hereof. Their preparation and the preparation of other backbones is also shown herein in the Examples. The chromophore is coupled to the amine backbone. This is effected very simply by employing a derivative of the chromophore having a leaving group para to the sulfonic acid salt, and displacing the leaving group with an amine backbone nitrogen. Leaving groups known in the art may be used, with halogens, especially chloro, bromo or iodo being preferred.

This displacement reaction is carried out in liquid phase. When, as in the preferred case where the backbone is a vinylamine polymer or copolymer, water dissolves both the chromophore and the backbone, it is an ideal solvent. If desired, water/organic mixed solvents may be used.

The displacement is carried out in a basic environment. Base in an amount adequate to neutralize any residual acids or acidic groups on the backbone is added at the outset of the reaction, followed by about 1 equivalent, i.e., 0.5 to 10.0 equivalents, of base per equivalent of amine present in the polymer backbone. Greater excesses of base may be used, but are not seen to offer advantage. Use of 1.0 to about 5.0 equivalents of base per equivalent of amine is preferred. Any pharmacologically acceptable base which can achieve a pH of about 12 or greater may be used. KOH and NaOH, and $K_2CO_3$ and $Na_2CO_3$ and mixtures thereof give good results. Preferred bases are NaOH and mixtures of NaOH and $Na_2CO_3$ containing up to 3:1 molar $Na_2CO_3$ to NaOH.

The concentration of reactants is most easily expressed in terms of a molarity of polymeric amine and the number of equivalents of chromophore present based on the amine. Polymer concentrations as low as about 0.05 molar or as great as about 5 molar may be used. Lower concentrations might be used, but are uneconomical. Preferably, the polymer is 0.2 to 2 molar. The chromophore is present in an amount of from about 0.2 to about 3.0 equivalents, basis amine, with amounts of from about 0.5 to about 1.5 equivalents being preferred. Clearly, the amount of chromophore employed should not be lower than the degree of substitution desired.

The reaction is carried out at elevated temperatures such as reflux (100°–120° C.) with temperatures of from about 70° C. to as high as 200° C. being useful. The higher temperatures necessitate the use of suitable superatmospheric pressure equipment.

Reaction times range from as little as about 0.25 hours at the highest temperature to as much as 48 hours. Degree of substitution increases with reaction time with 5 to 24 hours giving good reactions at 100°–120° C. Following the coupling reaction, it is often of interest to acetylate residual amines such as by contacting the reaction mixture with from 1 to 5 equivalents (basis amines) of acetic anhydride for a few minutes at a pH of 11–13 and a temperature of 0° C. to 10° C.

Following reaction (and, if used, acetylation) the polymeric colorant is recovered and purified, such as by precipitation in a nonaqueous nonsolvent or by ultrafiltration to remove low molecular weight species. Thereafter, the colorant material is often isolated via spray-drying or the like as a powder.

Use of Colorants

The colorants of this invention are excellent yellow colors. They are excellent matches for tartrazine. When added in coloring amounts, such as from 10 to 10,000 ppm wt, they color fibers and other substrates. They may be used alone or in combination with other polymeric or monomeric colorants. They are especially advantageous as colorants for edibles since when their molecular weights are above 1,000 daltons, they are not absorbed through the walls of the G.I. tract. In edible applications, the colorants are dissolved in beverages and syrups, sprayed onto or dry-mixed into powdered drink mixes and cake mixes and otherwise conventionally admixed with food beverages, pharmaceuticals and cosmetics. The amount of color used in these applications usually ranges from about 10 ppm wt to about 1,000 ppm wt, basis finished food, beverage or pharmaceutical.

In addition to use as "straight" soluble colors, the present yellow polymeric dyes may be deposited alone or with other polymeric or monomeric dyes onto the surface of particulate inorganic oxidic substrates, carriers or extenders to form insoluble pigments. These pigments, which may also be thought of as lakes, constitute another aspect of the present invention. The particulate substrate, carrier or extender may be classified as an inorganic oxidic material. Such materials include aluminaceous solids such as alumina, e.g., high and low activity alumina hydrate or light alumina hydrate which may take the forms $Al_2O_3.SO_3.3H_2O$ or $5\ Al_2O_3.2SO_3.xH_2O$, gloss white [3 $BaSO_4.Al(OH)_3$], talc, clay, silica, zinc oxide, baria, boria, titania, zirconia, magnesia, mixtures thereof, and the like. These materials are colorless or nearly so. These materials are most easily handled as pastes or suspensions and have particle sizes of from 0.5 to 50 microns generally with excellent results being achieved with particle sizes from 1 to 20 microns. Aluminaceous solids, especially the alumina hydrates, are the most commonly used substrates and are preferred in the present lakes.

The amount of colorant adsorbed onto the surface of the substrate particle may vary from as little as 1% to as much as 75%, basis total colorant plus substrate weight. The amounts of dye (also known as loadings) in the higher ranges, such as from 30% to 75%, are most unexpected as such loadings are not achieved with lakes of conventional monomeric dyes. Preferred loadings are from about 3% to about 50% with loadings of from about 5% to 35% being most preferred. These lakes have the advantages of being insoluble in acids and of not bleeding in use in the presence of salts or acids.

Lakes can be prepared by the general lake-forming reactions known in the art. One representative method is as follows.

(1) A weighed amount of alumina paste is slurried with approximately 3 to 4 times its weight of deionized water.

(2) The pH of the slurry (7.9–8.0) is adjusted to pH 4.2 by the dropwise addition of 1:1 HCl. A calculated amount of dye (based on the solids content of the alumina cake) is dissolved in the minimum amount of deionized water and then slowly added to the alumina slurry over a period of 15 to 20 minutes with constant, non-shear stirring (e.g., magnetic stirring bar or the like).

(3) During the addition of the dye and for approximately two hours thereafter, the pH of the slurry is maintained at about 4.2 with small additions of 1:10 HCl.

(4) The adsorption of dye onto the alumina is followed by spotting drops of the dispersion onto filter paper and observing bleed. Bleed is the spread of color which is due to the presence of soluble dye in the liquid phase of the dispersion. The reaction is considered terminated when bleed is not observed or when further reaction does not cause bleed to diminish.

(5) Finally, the lake is filtered through a funnel and washed thoroughly with small aliquots of deionized water. The filter cake is dried in an oven at 180° F. to constant weight, and the resulting product ground in a mortar.

The lake products essentially are insoluble pigments and may be used in pigment applications. They may be used in inks, in paints, and in colorings for edible and nonedible substrates such as frostings, candies, plastics, gelatin products, medicaments, pills and the like. In such uses the lakes may be present in a color imparting concentration such as from 1 ppm to as much as 10,000 ppm wt, or preferably 10 to 1000 ppm wt basic total composition.

The invention is further illustrated by the following Examples. These are given to exemplify the invention and are not to be construed as limiting its scope.

EXAMPLE I

In Section A, acetamidoethylene monomer is prepared.

In Section B, the monomer is formed into a poly(vinylamine) hydrochloride polymer.

In Section C, the polymer of B is used as backbone to form one polymeric colorant of this invention.

In Section D, the colorant of C is acetylated to yield a second polymeric colorant of this invention.

A. To 2304 g of acetamide (technical) in a 12 liter reaction flask is added 62.2 ml of 6 M aqueous sulfuric acid followed immediately by 661 g of acetaldehyde (99+%). This mixture is stirred and heated until the internal temperature reaches 78° C. (11 minutes) at which point the clear solution spontaneously crystallizes, causing a temperature rise to 95° C. The reaction product, ethylidenebis-acetamide, is not separated. Heating and stirring are continued for another five minutes to a temperature of 107° C. and a mixture of 150 g calcium carbonate (precipitated chalk) and 150 g of Celite ® diatomaceous earth powder is added. A first distillate fraction of water and acetamide is removed. The remaining materials are cracked at 35 mm Hg and 185° C. A fraction made up of vinylacetamide and acetamide is taken overhead, analyzed by NMR and found to contain 720 g of vinylacetamide and 306 g of acetamide. A portion of this pooled material is dissolved in isopropanol, cooled, and filtered to yield a stock solution.

B. An acetamidoethylene solution (8.0 moles) of Part A and 2,2'-azobis-(2-methylpropionitrile) AIBN (13.3 g, 0.08 moles) in 2.13 liters isopropanol is deoxygenated three times with Ar and refluxed for two hours. The isopropanol is removed by distillation and the polymer is then purified of monomeric impurities and formed into an aqueous solution. The polymer solution is concentrated to 30% w. The peak molecular weight ($M_p^{PS}$) is determined by gel permeation chromatography and found to be $6.0 \pm 1.5 \times 10^4$ daltons. This method, gel permeation chromatography, using purchased polystyrene or polystyrene sulfonate standards (porous glass bead supports) and a water or DMF eluent, is the method used to determine all experimental molecular weights given herein. A 30% aqueous polymer solution (1558 g, 505 moles) and 755 mls of 20° Be, aqueous hydrochloric acid (7.6 moles) are refluxed for 20 hours under argon. The resulting polyaminoethylenehydrochloride solution contains 2.05 meq/g amine and 1.05 meq/g HCl (5.15 meq/g total titratable acids).

C. An aqueous solution of the polymer of Part B (4.5 moles), 3-nitro-4-chlorobenzenesulfonic acid-sodium salt (Mobay Chemical-60% paste) (4.5 moles) and enough 50% w NaOH to neutralize the amine hydrochloride and residual acids (total titratable acids) is deoxygenated three times with argon, then heated to reflux (110° C.). After one hour, 50% w NaOH (396 g, 4.5 moles) is slowly added at reflux over a six-hour period. The total time for refluxing is eight hours.

The reaction mixture is cooled by adding 8 liters cool H$_2$O. One-half of the solution is purified by dialysis to remove salts and low molecular weight contaminants, concentrated and lyophilized to yield the polymeric colorant

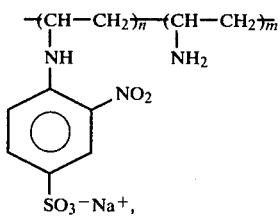

wherein n+m=100–170 and n=1.3–1.7(m).

D. The remaining one-half of the reaction product solution of Part C. is further cooled to 0°–5° C. by the addition of 3 kg of ice. Then, the colorant in solution is acetylated over a 15-minute period with acetic anhydride (106 mls, 1.13 moles). Enough 25% w NaOH is gradually added with stirring to keep the pH=11 for the first two-thirds of the acetylation, and pH=12 for the last third. This yields the acetylated colorant

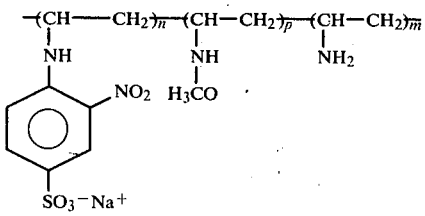

wherein n+m+p=100–170 and n=1.3–1.7 (m+p). Best values for these numbers indicate that the great majority of the amines have been acetylated, i.e., m is only from 0.01 to 0.2 times p.

Both of these colorants (of Part C. and Part D.) are polymeric yellow colorants. Each is useful as a substitute for FD&C Yellow No. 5 in edible systems. Their large polymeric size precludes their absorption through the walls of the gastrointestinal tract. Thus, the chance of systemic toxicity is substantially reduced. The two colorants are water-soluble. The acetylated colorant has better solubility properties in acidic aqueous systems.

EXAMPLE II

A smaller scale preparation of polymeric colorant is carried out. A poly(vinylamine)hydrochloride backbone having a 5.3×10$^4$ molecular weight is prepared for use as backbone using the technique of Part B of Example I.

Into a round-bottomed flask equipped with stirrer, argon bleed and condenser is charged 1.0 g of the polymer, 10 mls of 1 N NaOH, 1.06 g of Na$_2$CO$_3$ and 2.2 g of 3-nitro-4-chlorobenzenesulfonic acid. The molar amounts are:

Polymer—10 mmol
NaOH—10 mmol
Na$_2$CO$_3$—10 mmol
Sulfonic Acid (As Na Salt) 5 mmol The mixture is refluxed at 150° C. for three hours and gradually cooled by dilution to 60 mls. If the colorant were recovered, it would be

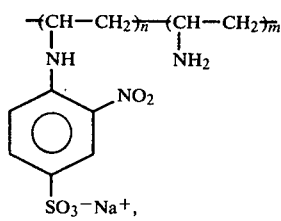

wherein n+m=660; n=0.31 (n+m), i.e., 31% of the amines are substituted.

Instead, the colorant is acetylated by cooling to 5° C. and gradually adding 5 mls of acetic anhydride and 5 mls of 50% NaOH over ten minutes. The product is purified by ultrafiltration using an Amicon PM-10 membrane in a lab scale ultrafiltration unit. This yields a solution of the product

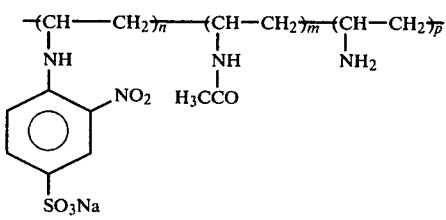

wherein n+m+p≅660; n=0.31 (n+m+p); p≅0.1(m).

EXAMPLE III

The reaction of Example II is repeated in principle with variation of a number of reaction parameters.

In one repeat, about 1.4 equivalents of sulfonic acid are used and the reaction is continued for 22 hours. This gives very complete substitution of the backbone amines 90% are substituted. The remaining 10% are present as amines or as acetylated amines.

In a second repeat, only 1.0 equivalents of the sulfonic acid is employed along with 1.0 equivalents of each of Na$_2$CO$_3$ and NaOH. An eight-hour reaction time is used to yield a final product having 58% of its amines substituted with chromophores. The remaining amines are present as amines or acetylated amines.

EXAMPLE IV

A. Acetamidoethylene solution (250 g, 1.025 moles), prepared as in Example I, Part A, is stripped to 133 mls. This material is charged to a 2 liter flask equipped with stirrer, condenser and heater along with 230 mls of a 25% solution (in water) of sodium vinyl sulfonate (0.552 moles), 400 mls of water and 4 g of AIBN polymerization catalyst. The mixture is heated with stirring. After about 50 minutes, it reaches 60°–70° C. where it is maintained for 24 hours. An additional gram of AIBN is added and the mixture is heated for an additional 12 hours to yield a product which is precipitated in 30 volumes of IPA and dried in a vacuum oven at 125° C. for four hours. This product has a formula

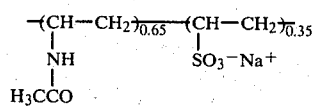

and a molecular weight of about 36,000, i.e., the polymer contains on average about 220–240 units of amine and about 120–140 units of sulfonate. This product is then hydrolyzed to the amine salt by treating with four equivalents of hydrochloric acid at 100°–110° C. for 20–24 hours. This hydrolysis product is poly(aminoethylene-sodiumethylenesulfonate) which is referred to herein at times as PAE-SES.

B. Into an egg-shaped flask equipped with stirrer, reflux condenser, argon bleed and oil bath heater, is added 1.3 g (10 mmol of amine) of the hydrolyzed copolymer of Part A and 10 mls (10 mmol) of 1 N NaOH. After the polymer dissolves, 2.12 g (20 meq) of $Na_2CO_3$ and 4.5 g (10 mmol) of 3-nitro-4-chloro-benzenesulfonic acid are added, the mixture is deoxygenated thrice and heated to 100° C. (reflux). After 24 hours, the reaction is cooled. The colorant is separated by removing the impurities via ultrafiltration and lyophilizing the retentate to yield 1.8 g of product of the structure

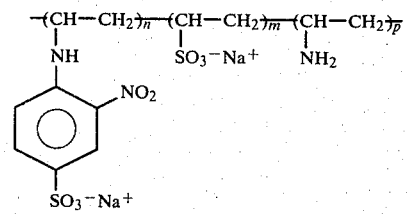

wherein $n = 0.40$ $(n+m+p)$; $m = 0.35$ $(n+m+p)$; $p = 0.25$ $(n+m+p)$.

C. A 0.5 g portion of the colorant of Part B is dissolved in 25 ml of water. At 0°–5° C., 2 mls of acetic anhydride is gradually added with stirring along with 1 N NaOH in an amount to hold the pH at 11–12. This causes the formation of an acetylated product

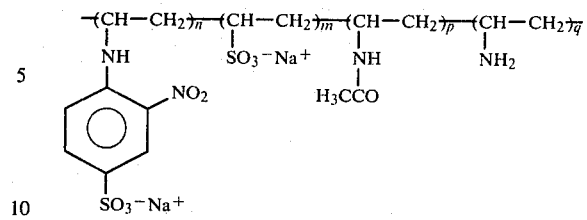

wherein $n = 0.40$ $(n+m+p+q)$; $m = 0.35$ $(n+m+p+q)$; $p = 0.24$ $(n+m+p+q)$; $q \leq 0.03$ $(n+m+p+q)$. The product is recovered.

EXAMPLE V

A. The preparation of poly(N-methylvinylamine) is begun by adding 500 g of N-methylaminoethanol to 1380 g (2.20 equivalents) of acetic anhydride at 115°–120° C. The reaction is exothermic (cooling required) and is complete by the time the addition is concluded. The bis-acetylated product,

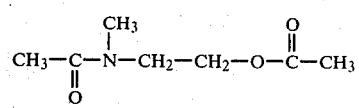

is isolated by vacuum distillation (bp 95°–98°/0.1 mm) as a colorless oil in about 93% yield.

The bis-acetylated product is pyrolyzed by passing 642 g of this material at a rate of 1.17 g/min through a Pyrex ® helices-packed quartz tube (3.5 cm diameter, 40 cm length), maintained at 480°. A 400 ml/min Argon stream is employed. The crude pyrolysate is a dark orange oil weighing 1350 g. The crude mixture containing the desired N-methylvinylacetamide is distilled (72° C./20 mm) to afford 250 g of purified N-methylvinylacetamide.

Polymerization of 225 g of purified N-methylvinylacetamide is carried out in 500 ml of methanol at 70° C. in the presence of 4 mol % of AIBN. The polymerization is complete within 12 hours and affords 200 g yield of poly(N-methylvinylacetamide).

The polymeric amide is hydrolysed with 6 N HCl at 125° to yield poly(N-methylvinylamine) as the hydrochloride. This material has a molecular weight of about 20,000 as determined by gel permeation chromatography comparisons to standards. The hydrolysis is monitored by NMR and requires roughly 40 hours to go to completion. The product is isolated in essentially quantitative yield by precipitation of the partially evaporated reaction mixture from isopropanol.

B. Into a round bottomed flask, equipped with stirrer, argon bleed and condenser, is charged 1.1 g of the polymer (10 mmole), 10 mls of 1 N NaOH, 2.12 g of $Na_2CO_3$ and 2.2 g of 3-nitro-4-chlorobenzenesulfonic acid. The mixture is refluxed at ~150° C. for six hours. One-half of the mixture is cooled, diluted, ultrafiltered and lyophilized to yield the solid colorant

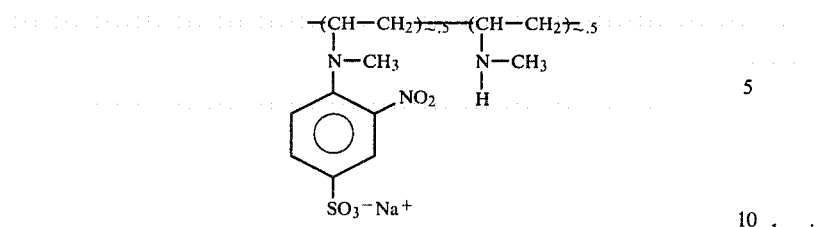

The remaining half is cooled to 0°–5° C. with ice addition. Gradually, 3 ml of acetic anhydride and ~3 mls of 50% NaOH are added to acetylate the residual amines. The product is isolated by ultrafiltration and lyophilization. It has the structure

EXAMPLE VI

The preparation of Example IV is repeated substituting an equimolar amount of acrylic acid for the vinyl sulfonate in the preparation of the polymer backbone. A 1:1 ratio of acrylic acid to amine is employed. This product would have a molecular weight of from $1.0 \times 10^4$ to $5.0 \times 10^4$ daltons. This product could be employed as a backbone for a polymeric colorant of this invention, prepared in accord with Example IV, having a structure With acetylation, the residual amines could be converted, in 90+% efficiency, to acetamides.

EXAMPLE VII

The preparation of Example IV is repeated. A different ratio of amine to sulfonate in the polymer backbone is achieved by adding vinyl sulfonate and acetamidoethylene in a 1:3 molar ratio. The resulting polymer is a PAE-SES copolymer having a 3 to 1 nitrogen to sulfur molar ratio and a molecular weight of $2.0–5.0 \times 10^4$ daltons. When this material is substituted in the colorant preparation of Example IV, a similar product, with similar chromophore substitution, results. Residual amine groups can be acetylated, if desired.

EXAMPLE VIII

Poly(aminostyrene)

having a molecular weight greater than 1000 is obtained from Polysciences, Inc. This material could be employed as a backbone in the preparation of a colorant of this invention.

Into a round bottomed flask, equipped with a stirrer, condenser, argon bleed and oil bath heater, is added 1.2 g (10 mmol of amine) of this polymer, 10 mls of 1 N NaOH, and 10 mls of pyridine and this mixture is stirred until the polymer goes into solution. Then, 2.12 g (20 meq) of $Na_2CO_3$ and 6.75 g (15 mmol) of 3-nitro-4-chlorobenzenesulfonic acid are added, the mixture is deoxygenated and heated to reflux. After 24 hours the mixture is cooled. The polymeric colorant having the formula separated. Impurities are removed by ultrafiltration and the product is lyophilized. If desired, the residual amines could be acetylated to amides using the general method of Part D of Example I.

EXAMPLE IX

Linear poly(ethyleneimine)

having a molecular weight above 1000 daltons, is obtained using the method of Saegusa et al. (Macromolecules, Vol. 5 (1972) page 108), and could be employed as a backbone in the preparation of a polymeric colorant.

Into a round bottomed flask, equipped with a stirrer, condenser, argon bleed and oil bath heater, is charged 0.45 g (10 mmol) of the poly(ethyleneimine), 20 mls of 1 N NaOH (20 mmol), 2.12 g of $Na_2CO_3$ (20 mmol), and 13.5 g (30 mmol) of 3-nitro-4-chlorobenzenefulfonic acid. The mixture is deoxygenated, heated to reflux and then stirred overnight, and thereafter cooled. The polymeric colorant product

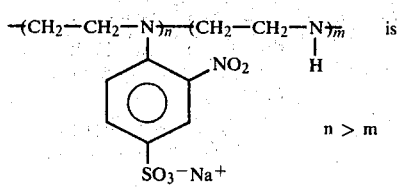 is

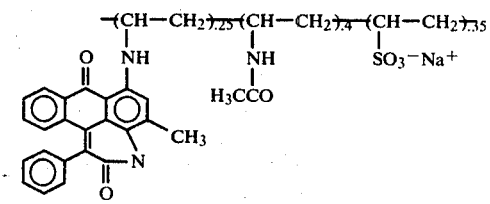

recovered, purified by ultrafiltration and lyophilized. If desired, the residual amines could be acetylated to amides using the general method of Part D of Example I.

EXAMPLE X

In Examples I-IX, all salts are sodium salts, since the bases used in their preparation are sodium bases. It will be appreciated that by substituting corresponding potassium bases in the preparations, potassium salts could be formed. Similarly, ammonium cations, or other pharmaceutically acceptable cations, can be substituted in the products.

EXAMPLE XI

A lake is prepared from the polymeric yellow colorant of Example I. Aluminum hydroxide, wet gel (44.8 g), is dispersed in 225 ml distilled water with a magnetic stirrer. This amount of wet gel, by analysis, is shown to contain 8.0 g of $Al_2O_3$ and 36.8 g of water. Hydrochloric acid 1:1 concentration is dripped in until the solution pH is 4.0 by pH electrode measurement. The colorant of Example I, 2.0018 g, is dissolved in 200 ml of distilled water. The solution of colorant is gradually added to the rapidly stirring suspension of aluminum hydroxide. The pH is held at 4.2-4.3. The polymeric colorant is adsorbed onto the surface of the aluminum hydroxide. Initially, only part of the dye is adsorbed such that a drop of the suspension on filter paper causes a deposit of colored solid (lake) at the center and a colored "halo" of dissolved colorant. After stirring for about an hour, the colorant is completely exhausted onto the alumina and the "halo" is colorless. The lake product is calculated to contain 20% (basis total weight of lake) of color. The lake is recovered by filtration, washed and spread to dry in pans in an oven at 120° C. When dry, the lakes are lumpy and agglomerated. Grinding produces the desired pigment-like powder. This lake is a bright yellow. It has the advantageous properties of being insoluble in acid and of not bleeding in acid.

EXAMPLE XII

The lake preparation of Example XI is repeated four times varying the amount of colorant solution employed. In the first repeat, 400 ml of solution is used, thus yielding a final product containing 33% colorant and having a darker shade than the lake of Example XI. In the second repeat, 600 ml of solution is used, yielding a yet darker orange product containing 43% colorant. In the third repeat, 100 ml of solution is used, yielding a lighter yellow lake containing 11% colorant. In the last repeat, 50 ml of colorant is used, yielding a light yellow 5.5% w colorant lake.

EXAMPLE XIII

The lake preparation of Example XI is repeated with one change. Instead of the colorant of Example I, a mixture of 1.5 g of the colorant of Example I and 0.5 g of a polymeric red colorant of the formula is employed. This results in a bright red-orange lake product which has the same advantageous properties observed with the lake of Example XI.

EXAMPLE XIV

The lake preparation of Example XI is repeated three times, each time varying the inorganic oxidic substrate. First, finely divided titania, (titanium dioxide) is used. Second, finely divided zirconia is used. Finally, silica is used. In each case, a lake is formed which is similar in character to the lake of Example XI.

COMPARATIVE EXPERIMENTS

A. A polymeric colorant is prepared using as chromophore a positional isomer of the material used in the present invention. Into a 50 ml flask, equipped with stirrer and argon bleed, is placed 0.9 g (9.5 mmol) of poly(aminoethylene) as used in Example I, 10 mls of water and 2.65 g (25 mmol) of $Na_2CO_3$. After deaerating the mixture, it is stirred and heated to 70° C. The chromophore,

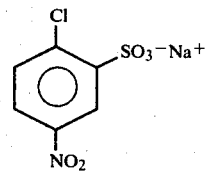

is added (1.19 g, 5.0 mmol) and the mixture is kept at 98°-100° C. for about 18 hours. Three drops of 50% NaOH and 10 ml of water are added during the reaction. The product is removed and ultrafiltered. A portion is acetylated and ultrafiltered, as shown in Example I.

This product (acetylated) has a structure very close to that of the colorants of the invention, i.e.,

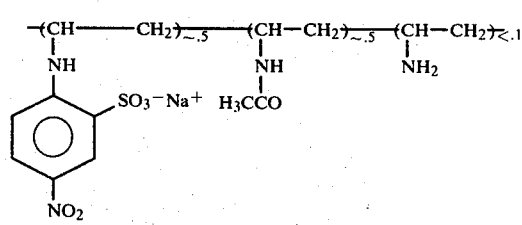

When the color of this material is evaluated, it is seen to be unacceptable as a replacement for existing food colors. It has a very weak greenish-yellow color. Colors of this invention, such as produced in Example I, do not have this failing.

B. A second similar colorant is produced. A 50 ml flask, equipped with stirrer and argon bleed and condenser, is charged with 1.0 g (7.7 mmol) of PAE-SES copolymer such as shown in Example IV. $Na_2CO_3$ (3.25 g, 31 mmol) and 20 ml water are added. The mixture is heated to 95° C. and 1.55 g (7.7 mmol) of chromophore

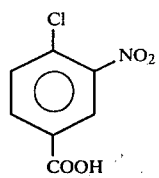

is added with 10 ml of water. The mixture is refluxed ~100° C. for about 20 hours, cooled, filtered through glass filter A, ultrafiltered and lyophilized to yield

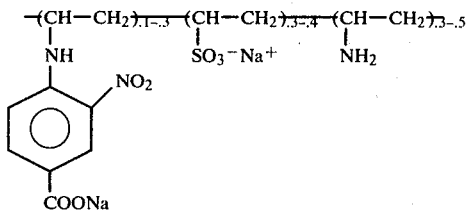

This product is evaluated as a yellow colorant. It is observed to have a very low coloring power (tinctorial strength). This property is quantitized by the color's absorptivity. The material has an absorptivity of 3.9. Compounds of the invention are higher, having absorptivities of 13–16 in most cases.

USE OF COLORANTS

Colorants prepared in the preceding Examples may be employed as colors for edible materials.

A. A "lemon" soft drink beverage powder is prepared.

The color of Example I, 15 g is dissolved in deionized water to form a yellow color solution. Next, 81 kg of dry granulated sugar (sucrose), 20–100 mesh, is tumbled in a ribbon blender. The color solution is then sprayed onto the surface of the tumbling sugar particles over 1–3 minutes. The tumbling is continued for another 1–3 minutes to uniformly color the sugar particles. Then, a very finely ground powdered dessicant, anhydrous calcium phosphate, may be added to the tumbling sugar to dry the yellow color onto the surface of the sugar particles. No more than about 500 g of dessicant is required. Alternatively, 30° C. dry air may be blown through the blender for a few minutes to dry the sugar particles. The mixture is a free flowing powder. Then, two minutes after phosphate addition, the following components are added to the mixer as 20–100 mesh dry powders.

3 kg of dried gum arabic clouding agent,
5 kg of citric acid,
0.5 kg of ascorbic acid,
1 kg of sodium citrate,
1.5 kg of a solidified emulsion of lemon oil in corn syrup solids.

This combination is tumbled for an additional ten minutes and packaged in water vapor impermeable envelopes. When 80 grams of this product are added to 950 ml of water, a light yellow colored lemonade-type noncarbonated beverage is obtained.

B. The preparation of A. is repeated with two changes. In place of the 15 g of the color of Example I, a mixture of 30 g of that color with 10 g of monomeric FD&C Red No. 40 is employed in the first repeat. Orange oil is substituted for lemon oil. This blend of yellow of this invention with an FD&C dye results in a mixture which, upon addition to water, yields an orangeade style beverage.

C. The preparation of B. is repeated with one change; in place of 10 g of Red No. 40, 15 g of a polymeric red dye of the formula

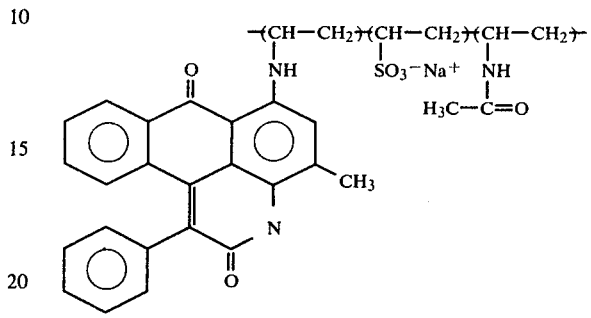

prepared in accord with the teachings of USSN 751,856 of Bunes is employed. This blend of a yellow of this invention with another polymeric dye yields a very suitable orange colored beverage mix which, upon addition to water, produces an orangeade style beverage.

D. The colors of this invention find use in dietetic foods and beverages where their nonabsorbability properties present the bonus of imparting a noncaloric property to the colors as well. A dietetic orange beverage concentrate is prepared. First, a colored bulking agent is formed by dissolving 10 kg of corn syrup solids, 100 g of sodium saccharin, 30 g of the yellow of Example II and 3 g of the polymeric red used in preparation C. in water and spray-drying. This yields a dry solid. This solid (6.5 kg) is charged to a laboratory scale V blender and tumbled. The yellow and red colors are firmly fixed into the bulking agent and do not segregate. The following other materials are added and tumbled.

| | |
|---|---|
| Citric Acid | 1300 g |
| Clouding agent - hydrogenated vegetable oil | 500 g |
| Sodium carboxymethylcellulose | 500 g |
| Ascorbic Acid | 200 g |
| Sodium Citrate | 200 g |
| Orange Flavor, including Firmenich Imit. Orange Flavor 59,427/AP Perma Stable Orange Flavors 6007 and 6032 Fries and Fries Art. Orange Flavors 11736 and 11169 | 750 g |

These materials dry-blend into the bulking agent. When this blended product is dissolved in water at a concentration of about 4%, it yields a noncarbonated dietary orange beverage. When it is dissolved in carbonic acid-saturated water at a level of 3.0%, an orange-colored carbonated drink results.

E. The colors are used in the preparation of a yellow colored lemon flavored instant pudding/pie filling powder. Quick hydrating dextrose (20 kg) is added to a ribbon type blender, then 175 g of lemon extract, 100 g of the polymer color of Example IV, and 50 g of vanillin are blended in. The color may be added as a fine (50–200 mesh) powder or as a solution in a minimum amount of water. Then, in sequence, 50 kg of granulated sugar, 1 kg of salt and 33 kg of pregelled modified waxy cornstarch are added. The mixture is blended for 15 minutes and packaged in 4 oz packages. In use, one package is added to a pint of milk while stirring until a smooth thick lemon-yellow colored pudding results (3-5 minutes).

F. The colors are used in baked on coating mixes. First, a concentrated solution of 30 parts of the color of Example I and 1 part of FD&C Red #40 is prepared and gradually added to 200 parts of granulated sugar tumbling in a blender. Warm (30° C.) dry air is passed through the tumbling mass to remove water and form a dry colored sugar powder. This powder is used in the following coating mix.

| Component | Percent by Weight |
| --- | --- |
| Flour | 15 |
| Bread crumbs | 57.75 |
| Salt | 7 |
| Monosodium glutamate | 1 |
| Herbs and spices | 1 |
| Solid fat powder | 15 |
| Calcium phosphate | 3 |
| Color powder | 0.25 |

This mixture (150 g) is placed in a plastic bag. Uncooked chicken pieces, previously dipped in milk, are added to the bag, shaken with the coating mix, removed, placed in a single layer on a cookie sheet and baked for 50 minutes at 400° F. The coating mix employing the color of this invention imparts a uniform golden "simulated deep fried" color to the chicken as it bakes.

G. The colors of this invention are used in prepared snack foods. Raw corn meal (100 kg), cottonseed oil (6.5 kg), water (7.5 kg) and color of Example I (25 g) are mixed together in a blender until homogeneous. Then, 10 kg of dehydrated cheddar cheese, 500 g of salt, 250 g of monosodium glutamate are added and blended into the mixture. The mixture is then shoveled into the hopper of an extruder and extruded through a 1 cm orifice. The orifice is elongated and heated to 130° C. so that the water in the mixture vaporizes and puffs the mixture as it is extruded. The extrudate is cut into 4 cm pieces and baked at 160° C. for 15-20 minutes. After baking, the resulting cheese flavored-cheese colored snacks are dusted with 1% w salt and packaged.

H. Using the techniques of preparation G., but altering the composition of the feed mixture, and the shape of the extruder dye to compositions and shapes more appropriate for puffed breakfast cereals, the polymeric yellow colors of this invention are incorporated into presweetened and nonpresweetened breakfast cereals.

I. The yellow color of this invention prepared in Example II is dissolved in distilled water at a 2% level. This solution is packaged for use as a food coloring for frostings, cakes, decorated eggs and other home uses.

J. Using the methods of spraying a solution of color onto sugar grains shown in preparation A., a color of this invention is added to sugar which, in turn, is used as a component in a powder for making lemon-flavored gelatin desserts.

K. The polymeric colorant of Example I is used to color gelatin capsules for medicaments. USP gelatin is dissolved in water with heating. The colorant of Example I, 300 ppm (basis weight of gelatin is added. The colored gelatin solution is then formed into yellow capsules by methods known to the art.

L. The polymeric lake of Example XI is employed in a pill coating. USP gelatin is dissolved in water and evaporated to give a solution the consistency of light cream. The lake of Example IX, 200 ppm basis weight of gelatin, is then suspended in the gelatin solution. Ascorbic acid tablets and aspirin tablets are covered with this yellow suspension and quickly dried to obtain shiny yellow coated tablets.

M. The polymeric lake of Example XI is used as a component of cosmetics. It is blended and ground with red lakes and brown lakes. Ten parts of this blend of lake are then added to a melt composed of 15 parts beeswax, 4 parts petrolatum, 55 parts semihydrogenated castor oil, 10 parts paraffin oil, and 4 parts lanolin. This mixture is stirred and compounded on a heated roller mill and placed in containers. It serves as an anhydrous cream rouge.

N. The polymeric lake of the third preparation of Example XII is employed as a coloring in frosting. Margarine (500 g) is placed in a mixer, followed by 0.5 g of the lake of preparation 3 of Example X as a fine (100% passes 300 mesh) powder. The lake is thoroughly blended into the margarine. Then, 4 kg of confectioners sugar, 30 ml of imitation vanilla extract, 30 g of salt, and 5 ml of banana flavoring are added to the mixture and slowly blended with the margarine. Water is gradually added until a spreadable coherent mass of yellow colored banana-flavored frosting is obtained.

O. The polymeric colorant of Example VIII is used as a colorant for a detergent based shampoo.

| | |
| --- | --- |
| Fatty acid-protein condensation products | 30% |
| Triethanolamine lauryl sulfate | 20% |
| Sodium alginate (3% solution) | 5% |
| Glycerol | 3% |
| Water | 42% |
| Color of Example VIII | 100 ppm | are combined in a blender and mixed until homogeneous. This yields a yellow-colored shampoo product employing the colorant of this invention.

What is claimed is:

1. A polymeric yellow colorant soluble in room temperature pH 7 water to an extent of not less than 1,000 ppm by weight, and comprising (1) an amine containing, nonchromophoric, essentially linear backbone polymer, said backbone polymer having a molecular weight of from 1,000 to 200,000 daltons and (2) a plurality of chromophores covalently depending from the amine moieties of said backbone polymer, said chromophores having the basic nucleus:

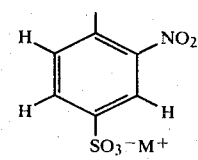

wherein M+ is a pharmacologically acceptable cation, and said pendant chromophores being directly covalently linked to said backbone polymer through the amine moieties thereof via an aromatic carbon-nitrogen single bond and defining a nitrosulfanilic acid structure therewith.

2. The polymeric yellow colorant as defined by claim 1, said plurality of chromophores (2) ranging from between 10 and 2000.

3. The polymeric yellow colorant as defined by claim 2, said backbone polymer being a polymer of vinylamine.

4. The polymeric yellow colorant as defined by claim 3, said backbone polymer being homopolyvinylamine.

5. The polymeric yellow colorant as defined by claim 1, consisting essentially of recurring units of the structural formula:

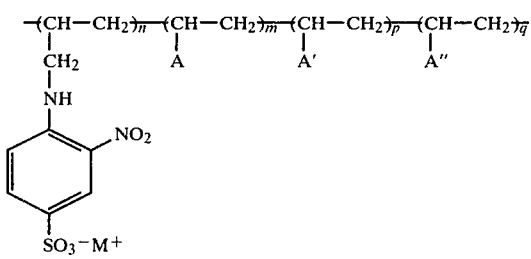

wherein A, A' and A'' are independently selected from the group consisting of:

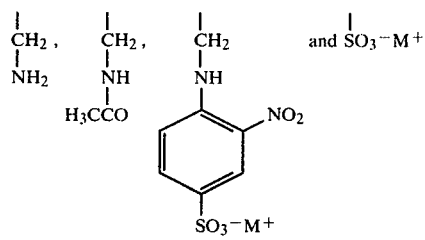

and further wherein n, m, p and q are numbers such that the sum of n, m, p and q is from 40 to 8000 and n is not less than 0.2 times the sum of m+p+q.

6. The polymeric yellow colorant as defined by claim 5, wherein A, A' and A'' are independently selected from the group consisting of:

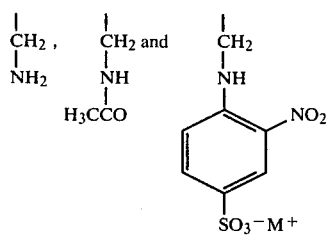

7. The polymeric yellow colorant as defined by claim 1, consisting essentially of recurring units of the structural formula:

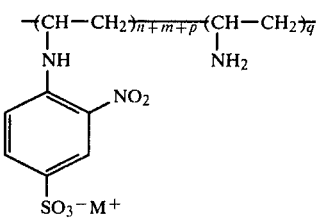

wherein n, m, p and q are numbers such that the sum of n, m, p and q is from 40 to 8000 and n is not less than 0.2 times the sum of m+p+q, and wherein n+m+p is from 0.3 to 10 times q.

8. The polymeric yellow colorant as defined by claim 1, consisting essentially of recurring units of the structural formula:

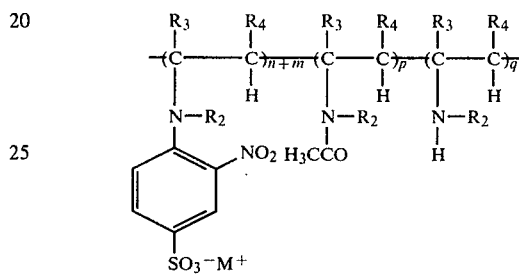

wherein $R_2$ is hydrogen or lower alkyl having from 1 to 4 carbon atoms and $R_3$ and $R_4$ are independently hydrogen, methyl or ethyl wherein n, m, p and q are numbers such that the sum of n, m, p and q is from 40 to 8000 and n is not less than 0.2 times the sum of m+p+q, and wherein n+m is from 0.3 to 10 times p+q and q is from 0.01 to 0.4 times p.

9. The polymeric yellow colorant as defined by claims 7 or 85, wherein n+m+p+q is from 500 to 7000, and n+m+p is from 1 to 7 times q.

10. The polymeric yellow colorant as defined by claim 9, wherein n+m+p is from 1.25 to 4 times q.

11. The polymeric yellow colorant as defined by claim 1, consisting essentially of recurring units of the structural formula:

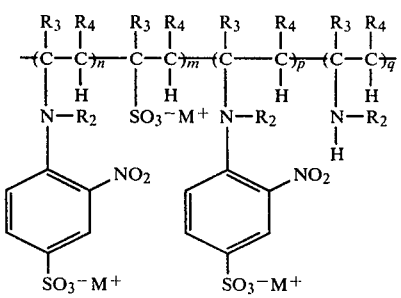

wherein $R_2$ is hydrogen and $R_3$ and $R_4$ are independently hydrogen, wherein n, m, p and q are numbers such that the sum of n, m, p and q is from 80 to 2000 and n is not less than 0.2 times the sum of m+p+q, and wherein n+p+q equals from 0.5 to 4 times m and n+p equals from 1 to 7 times q.

12. The polymeric yellow colorant as defined by claim 1, consisting essentially of recurring units of the structural formula:

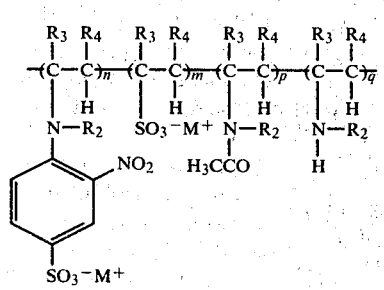

wherein $R_2$ is hydrogen or lower alkyl having from 1 to 4 carbon atoms and $R_3$ and $R_4$ are independently hydrogen, methyl or ethyl, wherein n, m, p and q are numbers such that the sum of n, m, p and q is from 80 to 2000, $n+p+q$ equals from 0.5 to 4 times m, n equals from 1 to 7 times $p+q$, and q equals from 0.02 to 0.1 times p.

13. The polymeric yellow colorant as defined by claim 1, consisting essentially of recurring units of the structural formula,

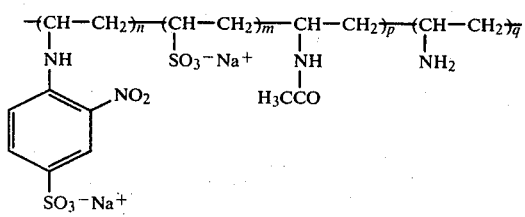

wherein n is a number from 150 to 500, m is a number from 200 to 600, p is a number from 250 to 700 and q is a number from 25 to 100, such that n:m:p:q are in a ratio of about 5:7:8:10.5.

14. The polymeric yellow colorant as defined by claims 8 or 12, wherein each $R_3$ and $R_4$ is hydrogen.

15. The polymeric yellow colorant as defined by claim 14, wherein each $R_2$ is hydrogen.

16. The polymeric yellow colorant as defined by claim 2, said backbone polymer having essentially no crosslinks.

17. The polymeric yellow colorant as defined by claim 2, said backbone polymer comprising only covalent bonds stable under the conditions of the mammalian gastrointestinal tract.

18. The polymeric yellow colorant as defined by claim 2, said backbone polymer being selected from the group consisting of carbon-nitrogen aliphatic secondary amine backbone polymer; carbon-oxygen aliphatic ether, pendant amino group backbone polymer; alkyl carbon-carbon, pendant amino group backbone polymer; and copolymers thereof.

19. The polymeric yellow colorant as defined by claim 18, said backbone polymer having a molecular weight of from about 2,000 to 100,000 daltons.

20. The polymeric yellow colorant as defined by claim 19, said backbone polymer being an essentially linear alkyl carbon-carbon backbone polymer.

21. The polymeric yellow colorant as defined by claim 3, said backbone polymer being a copolymer of vinylamine with a comonomer selected from the group consisting of vinyl sulfonate, acrylic acid, methacrylic acid and vinylphosphonate.

22. The polymeric yellow colorant as defined by claim 2, said backbone polymer being a polymer of ethyleneimine.

23. The polymeric yellow colorant as defined by claim 1, consisting essentially of recurring units of the structural formula:

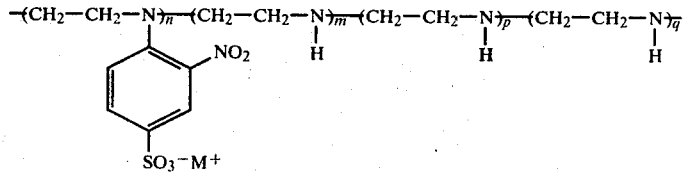

wherein n, m, p and q are numbers such that the sum of n, m, p and q is from 40 to 8000 and n is not less than 0.2 times the sum of m, p and q.

24. The polymeric yellow colorant as defined by claim 2, said backbone polymer being a polymer of lower alkylamine.

25. The polymeric yellow colorant as defined by claim 2, said backbone polymer being a polymer of dilower dialkylamine.

26. The polymeric yellow colorant as defined by claim 2, said backbone polymer being a polymer of aminoethylacrylate.

27. The polymeric yellow colorant as defined by any of claims 2, 5, 7, 8, 11 or 12, wherein $M^+$ is selected from the group consisting of $Na^+$, $K^+$ and $NH_4^+$.

28. The polymeric yellow colorant as defined by claim 27, wherein $M^+$ is $Na^+$.

29. The polymeric yellow colorant as defined by claim 1, the amine moieties comprising said amine containing, nonchromophoric, essentially linear backbone polymer being secondary amine groups present and directly covalently bonded within said backbone polymer.

30. The polymeric yellow colorant as defined by claim 1, the amine moieties comprising said amine containing, nonchromophoric, essentially linear backbone polymer being primary amine groups pendant from said backbone.

31. The polymeric yellow colorant as defined by claim 1, the amine moieties comprising said amine containing, nonchromophoric, essentially linear backbone polymer being secondary amine groups pendant from said backbone.

32. The polymeric yellow colorant as defined by claim 29, containing residual, non-chromophore-substituted secondary amine groups present and directly covalently bonded within said backbone polymer.

33. The polymeric yellow colorant as defined by claims 30 or 31, containing residual, non-chromophore-substituted secondary amine groups pendant from said backbone.

34. The polymeric yellow colorant as defined by claim 32, at least a portion of said residual, non-chromophore-substituted amine groups being acetylated.

35. The polymeric yellow colorant as defined by claim 1, said backbone polymer comprising copolyvinylamine/vinylsulfonate.

36. The polymeric yellow colorant as defined by any of claims 1, 3, 18, 29, 30, 31, 32, or 34, said backbone polymer further containing water-solubilizing polar groups.

37. The polymeric yellow colorant as defined by claim 30, said backbone polymer being homopolyvinylamine.

38. The polymeric yellow colorant as defined by claim 37, containing residual, non-chromophore-substituted primary amine groups, at least a portion of said residual groups being acetylated.

39. The polymeric yellow colorant as defined by claims 29 or 32, said backbone polymer being polyethyleneimine.

40. The polymeric yellow colorant as defined by claim 32, said backbone polymer being polyethyleneimine and at least a portion of said residual, non-chromophore-substituted secondary amine groups being acetylated.

41. The polymeric yellow colorant as defined by claims 30 or 31, or said amine groups being pendant to the backbone polymer through a 1 to 4 carbon alkyl bridge.

42. The polymeric yellow colorant as defined by claims 30 or 31, said amine groups being pendant to the backbone polymer through a 2 to 4 carbon carboxylate ester bridge.

43. The polymeric yellow colorant as defined by claims 30 or 31, said amine groups being pendant to the backbone polymer through a 2 to 4 carbon alkyl ether bridge.

44. The polymeric yellow colorant as defined by claims 30 or 31, said amine groups being pendant to the backbone polymer through a 2 to 4 carbon alkyleneamine bridge.

45. The polymeric yellow colorant as defined by claim 33, at least a portion of said residual, non-chromophore-substituted amine groups being acetylated.

46. The polymeric yellow colorant as defined by claim 33, said backbone polymer further containing water-solubilizing polar groups.

47. The polymeric yellow colorant as defined by claim 1, consisting essentially of recurring units of the structural formula:

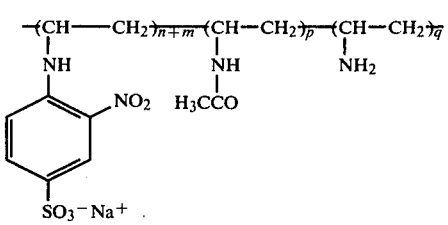

wherein n+m is a number from 900 to 3500, p is a number from 600 to 2000, and q is a number from 10 to 100, n+m, p and q being further defined as being in a ratio of about 6 to 4 to 0.1.

* * * * *